United States Patent [19]
Rogut

[11] Patent Number: 5,332,498
[45] Date of Patent: * Jul. 26, 1994

[54] INTEGRATED HOLLOW FIBER MEMBRANE PERMEATORS AND METHOD OF FABRICATING INTEGRATED PERMEATORS

[75] Inventor: Jan Rogut, Boulder, Colo.

[73] Assignee: Transfair Corporation, Wheatridge, Colo. ; a part interest

[ * ] Notice: The portion of the term of this patent subsequent to Aug. 24, 2010 has been disclaimed.

[21] Appl. No.: 60,345

[22] Filed: May 11, 1993

Related U.S. Application Data

[63] Continuation-in-part of Ser. No. 961,140, Oct. 13, 1992, Pat. No. 5,238,562.

[51] Int. Cl.⁵ .............................................. B01D 63/02
[52] U.S. Cl. ............................. 210/321.8; 210/321.89; 210/500.23
[58] Field of Search ....................... 210/500.23, 321.89, 210/321.80; 264/41, 45.1

[56] References Cited

U.S. PATENT DOCUMENTS

| | | | |
|---|---|---|---|
| 4,220,535 | 9/1980 | Leonard | 210/321 R |
| 4,812,184 | 3/1989 | Coplan et al. | 156/84 |
| 4,871,379 | 10/1989 | Edwards | 55/158 |
| 4,880,440 | 11/1989 | Perrin | 55/16 |
| 4,904,327 | 2/1990 | Clark | 156/250 |
| 4,959,152 | 9/1990 | Nichols | 210/651 |
| 5,000,855 | 3/1991 | Nichols | 210/651 |
| 5,013,331 | 5/1991 | Edwards et al. | 55/16 |
| 5,034,164 | 7/1991 | Semmens | 261/122 |
| 5,059,374 | 10/1991 | Krueger et al. | 204/156 |
| 5,137,631 | 8/1992 | Eckman et al. | 210/321.8 |
| 5,141,031 | 8/1992 | Baurmeister | 139/383 R |
| 5,143,613 | 9/1992 | Bitter et al. | 210/321.8 |
| 5,154,832 | 10/1992 | Yamamura et al. | 210/640 |
| 5,174,900 | 12/1992 | Nichols et al. | 210/651 |
| 5,238,562 | 8/1993 | Rogut | 210/321.8 |

*Primary Examiner*—Frank Spear
*Attorney, Agent, or Firm*—John R. Flanagan

[57] ABSTRACT

An integrated hollow fiber membrane permeator includes a plurality of groups of hollow fibers of permeable membrane material having internal flow channels extending therethrough with opposite first and second ends thereof open at opposite first and second end portions of the hollow fibers. The integrated permeator also include at least one elongated solid non-permeable support body encapsulating and supporting interiorly at least one of the respective opposite end portions of the hollow fibers. The solid non-permeable support body contains interiorly a plurality of flow disbribution passages which intersect and communicate with the open ends of the one of the respective opposite end portions of the hollow fibers. The solid non-permeable support body also has at least one external port opening to the exterior thereof and contains at least one flow feed passage communicating the plurality of flow distribution passages to the one external port. In other embodiments of the integrated permeator the other of the respective opposite end portions of the groups of hollow fibers are either free of or can be encapsulated by the one elongated solid non-permeable support body. In still another embodiment, the integrated permeator includes a second elongated solid non-permeable support body encapsulating and supporting interiorly the other of the respective opposite end portions of the groups of hollow fibers.

37 Claims, 4 Drawing Sheets

FIG. 16F

INTEGRATED HOLLOW FIBER MEMBRANE PERMEATORS AND METHOD OF FABRICATING INTEGRATED PERMEATORS

CROSS-REFERENCE TO RELATED APPLICATION

This application is a continuation-in-part of copending U.S. application Ser. No. 07/961,140, filed Oct. 13, 1992, now U.S. Pat. No. 5,238,562.

DESCRIPTION

1. Technical Field

The present invention generally relates to membrane separation permeators employing hollow fiber membrane technology and, more particularly, is concerned with integrated hollow fiber membrane permeators and method of fabricating such integrated permeators.

2. Background Art

Permeable hollow fiber membrane modules, commonly referred to as permeators, are being increasingly designed for employment in a wide variety of fluid (gas and liquid) separations. In such operations, a feed stream is brought into contact with the surface of the membrane; a pressure differential is maintained across the membrane; the more readily permeable component of the feed stream passes through the membrane and is withdrawn as the permeate stream; and the less readily permeable component does not pass through the membrane and is withdrawn as a non-permeate, or retentate, stream.

Heretofore, most prior art permeators have included individual hollow fibers or bundles of hollow fibers, tubesheets in the form of solid bodies of resinous material potting the opposite ends of the fibers such that their internal bores or channels communicate through the tubesheets, and a pressure container formed by an elongated pressure vessel and a pair of opposite end heads or caps closing the opposite ends of the pressure vessel. The opposite tubesheets with the fibers extending therebetween are supported and sealed within the pressure container and interior manifolds or chambers are formed between the outer faces of the tubesheets and the end caps through which communication is established between end cap ports and the internal channels of the hollow fibers which open at the outer faces of the tubesheets.

The pressure container thus contains, protects and provides support to the hollow fibers, protects the operator from harm due to destructive failures in the fibers, and guides and separates the flow of permeate and retentate. The elongated vessel and end caps of the pressure container are thus separate but necessary parts of the prior art permeator. Representative examples of such permeators are the ones disclosed in U.S. Pat. Nos. to Leonard (4,220,535), Pertin (4,880,440), Clark (4,904,327), Edwards et al (5,013,331), Krueger et al (5,059,374), and Eckman et al (5,137,631).

It is generally recognized that the pressure container adds substantially to the cost of the permeator since it must be a highly stress and pressure resistant structure as well as large in size to contain all of the other elements. The cost of the pressure container increases rapidly with increase in its internal volume. By some estimates, the pressure container alone contributes as much as 70% of the total cost of the permeator. It is therefore economically advantageous to reduce the volume of any high pressure container as much as possible or even more to eliminate the need for it entirely.

U.S. Pat. No. 4,871,379 to Edwards represented a step in the right direction toward lowering of such costs by proposing a shell-less permeator design. In the Edwards shell-less permeator the elongated vessel of the pressure container typically surrounding the working sections of the hollow fibers is eliminated by feeding a pressurized raw gas mixture internally into the bores or channels of the hollow fibers. However, the opposite end caps of the pressure container are retained. Thus, the design of the Edwards patent represents only a partial step toward the cost savings which might be realized by elimination of the pressure container.

As described above, the state of the prior art is thus far limited to removing only the elongated vessel part of the high pressure container extending around the working sections of the hollow fibers. It is still necessary to supply the hollow fiber membrane modules with expensive external high pressure end caps. These end caps together with the opposite end tubesheets are used to form the pressure manifolds or chambers through which to supply the raw fluid mixtures to the open ends of the parallel hollow fibers.

In light of these above-described shortcomings in the state of existing hollow fiber membrane permeator designs, a pressing need still remains for improvements which will bring about significant cost savings while retaining the capability of operation at acceptable levels of productivity.

DISCLOSURE OF INVENTION

The present invention provides integrated hollow fiber membrane permeators and method of fabricating such integrated permeators which are designed to satisfy the aforementioned needs. The integrated hollow fiber membrane permeators of the present invention eliminate the necessity to employ the entire pressure container by permanently integrating with the particular arrangement of hollow fibers the structures necessary for supporting the hollow fibers and for containing flow distribution passages of small cross-sectional size which communicate with the internal bores or channels of the hollow fibers. These integrated structures are inseparable and irremovable from the hollow fibers without destroying the fibers due to their being manufactures simultaneously with the arranging of the hollow fibers.

Also, these integrated structures serve to incorporate the functions of the prior art pressure container, end communication chambers and resinous tubesheets as they eliminate the mass of structures associated therewith. As a result of such integration of the supporting and communicating structures with the hollow fibers and the resultant total elimination of the high-cost pressure containers, a substantial savings in the total production cost of the permeator as well as a more compact and safe module design can be realized.

Further, the integrated structure has the ability to withstand higher pressures than the hollow fibers and so only the stress resistance of the hollow fibers are the limiting factor in the design. In feeding a pressurized fluid mixture internally into the internal bores or channels of the hollow fibers, such as was done in the earlier-cited Edwards patent, the integrated structure and hollow fibers, in effect, now function as multiple high pressure micro vessels without the extra mass and cost. The geometry of the hollow fibers is not a limitation with respect to the permeators of the present invention. Also, the hollow fibers utilized can have the capability of selective or nonselective mass transport through their walls.

Accordingly, the present invention is directed to an integrated hollow fiber membrane permeator which comprises: (a) at least first and second groups of hollow fibers of permeable membrane material, each of the hollow fibers of the groups having first and second spaced opposite end portions and an elongated main portion extending between and interconnecting the first and second opposite end portions, each of the hollow fibers of the groups also having an internal flow channel extending through the main portion with first and second ends at the first and second opposite end portions of the hollow fiber; and (b) at least one elongated solid non-permeable support body encapsulating and supporting interiorly one of the first and second opposite end portions of the hollow fibers of the groups and containing interiorly at least first and second flow distribution passages communicating respectively with corresponding ones of the first and second ends of the internal flow channels of the hollow fibers of the groups, the one solid support body also having at least one external port opening to the exterior thereof and containing at least one flow feed passage communicating the first and second flow distribution passages to the one external port. The one solid support body is thus constructed to inseparably and irremovably support the first opposite end portions of the hollow fibers. In one embodiment, the main portion and other of the first and second opposite end portions of the hollow fibers of the groups are free of the one solid support body.

In another embodiment, the other of the first and second opposite end portions of the hollow fibers of the groups are also encapsulated and supported by the one solid support body interiorly thereof such that the others of the first and second ends of the internal flow channels of the hollow fibers of the group are in communication with the first and second flow distribution passages in the one solid support body. In this embodiment, the main portions of the hollow fibers can be arranged in the shape of loops. Also, the solid support body inseparably and irremovably supports the first and second opposite end portions of the hollow fibers.

In still another embodiment, the integrated permeator includes at least a second elongated solid non-permeable support body encapsulating and supporting interiorly the other of the first and second opposite end portions of the hollow fibers of the groups and contains interiorly first and second flow distribution passages communicating respectively with corresponding ones of the first and second ends of the internal flow channels of the hollow fibers of the groups. The second solid support body has at least one external port opening to the exterior thereof and contains at least one flow feed passage communicating the first and second flow distribution passages to the one external port. Also, in this embodiment, the second solid support body inseparably and irremovably supports the second of the opposite end portions of the hollow fibers.

The present invention is also directed to a method of fabricating an integrated hollow fiber membrane permeator which comprises the steps of: (a) applying a first layer of a glue-type material in a fluid state onto a non-stick surface; (b) applying a portion of a first group of hollow fibers of permeable membrane material having internal flow channels upon the first layer of glue-type material while still in the fluid state and before transforming to a solid state so as to encapsulate the applied portions of the hollow fibers of the first group into the first layer of glue-type material; (c) after transforming of the first layer of glue-type material to the solid state, forming in the first layer and in the applied portion of the hollow fibers of the first group encapsulated and supported therein a first flow distribution passage so as to intersect and communicate with the internal flow channels of the hollow fibers of the first group; and (d) applying a second layer of glue-type material in a fluid state over the first flow distribution passage formed in the first layer and in the applied portion of the hollow fibers of the first group so as to cause the second layer to overlie and adhere to the first layer and thereby encapsulate the first flow distribution passage and the applied portion of the hollow fibers between the first and second layer of glue-type material after transforming of the second layer to a solid state.

The method further comprises the steps of: (e) applying a third layer of a glue-type material in a fluid state onto the second layer; (f) applying a portion of a second group of hollow fibers of permeable membrane material having internal flow channels upon the third layer of glue-type material while still in the fluid state and before transforming to a solid state so as to encapsulate the applied portions of the hollow fibers of the second group into the third layer of glue-type material; (g) after transforming of the third layer of glue-type material to the solid state, forming in the third layer and in the applied portion of the hollow fibers of the second group encapsulated and supported therein a second flow distribution passage so as to intersect and communicate with the internal flow channels of the hollow fibers of the second group; and (h) applying a fourth layer of glue-type material in a fluid state over the second flow distribution passage formed in the third layer and in the applied portion of the hollow fibers of the second group so as to cause the fourth layer to overlie and adhere to the first layer and thereby encapsulate the second flow distribution passage and the applied portion of the hollow fibers of the second group between the third and fourth layers of glue-type material after transforming of the fourth layer to the solid state.

The method further comprises the steps of: (i) forming a feed port in an exterior surface of one or more of the first, second, third or fourth layer; and (j) forming a flow feed passage in the first, second, third and fourth layer so as to intersect with the first and second passages and communicate the first and second passages with the feed port.

The method still further comprises the steps of applying a support screen having internal spaces on the support surface, then applying the first layer in the fluid state over the support screen so as to impregnate the internal spaces of the screen, applying another support screen having internal spaces upon the second layer before transforming of the second layer to the solid state, then applying the third layer in the fluid state over the support screen so as to impregnate the internal spaces of the screen and applying still another support screen having internal spaces upon the fourth layer before transforming of the fourth layer to the solid state.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Referring to the drawings, and particularly to FIGS. 1-6, 7-10 and 11-14, there is illustrated the respective elementary structures of three embodiments of an integrated hollow fiber membrane permeator, generally designated 10, respectively, having constructions in accordance with the present invention. These figures illustrate the "elementary structures" of these three embodiments in the sense that each of the structures represents the basic component or building block which is duplicated, repeated or multiplied many times to provide the integrated hollow fiber membrane permeator having the design of that particular embodiment.

Referring to FIGS. 1-6, the first embodiment of the integrated permeator 10 includes at least first and second groups of hollow fibers 12, 14 formed of a suitable permeable membrane material, and at least one elongated solid non-permeable support body 16, which encapsulates and supports in its interior, portions of the hollow fibers 12, 14 of the first and second groups thereof. As will be described later, the solid support body 16 is fabricated so as to be inseparably and irremovably connected with the portions of the hollow fibers 12, 14.

The hollow fibers 12, 14 of each group have first and second spaced opposite end portions 12A, 12B and 14A, 14B and elongated main portions 12C and 14C extending between and integrally connecting with the first and second opposite end portions 12A, 12B and 14A, 14B. Also, the hollow fibers 12, 14 of each group have internal flow bores or channels 18, 20 extending through the main portions 12C and 14C and terminating at first and second opposite ends 18A, 10A which are open at the first and second opposite end portions 12A, 12B and 14A, 14B of the hollow fibers 12, 14. Some examples of suitable materials from which the hollow fibers 12, 14 can be made are from polyolefine polymers, polysulfones, silica-based polymers, carbon polymers and ceramics.

Figure 1:
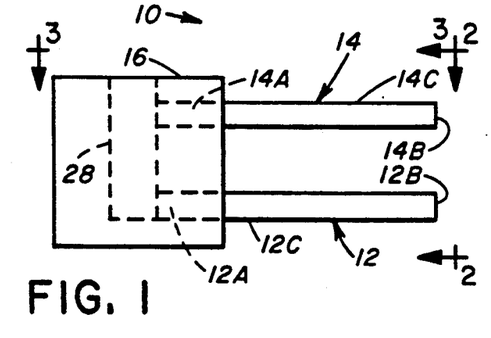
FIG. 1 is a side elevational view of an element of a first embodiment of an integrated hollow fiber membrane permeator in accordance with the present invention.
Figure 2:
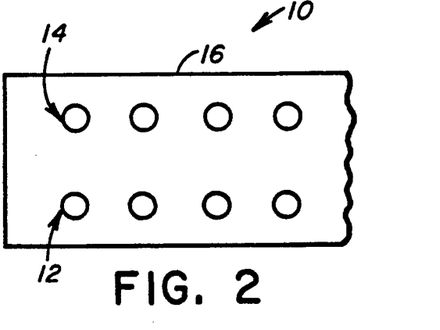
FIG. 2 is an end elevational view of the integrated permeator as seen along line 2—2 of FIG. 1.
Figure 3:
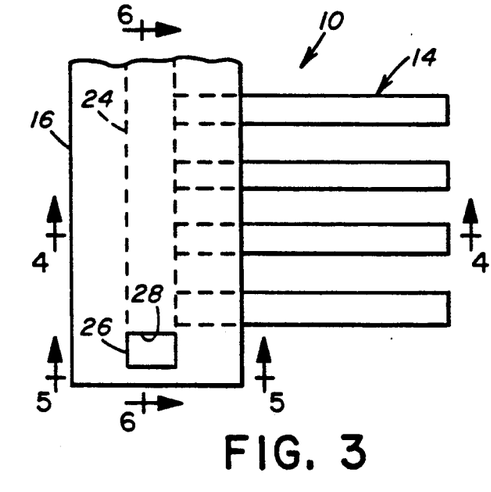
FIG. 3 is a top plan view of the integrated permeator as seen along line 3—3 of FIG. 1.
Figure 4:
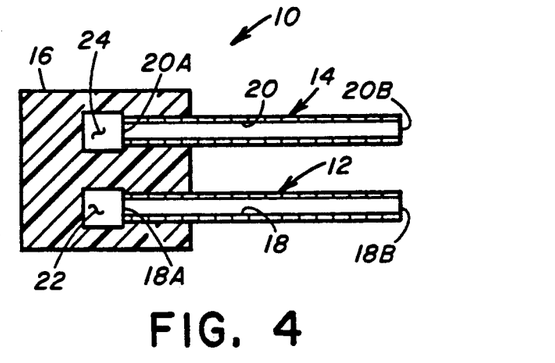
FIG. 4 is a first sectional view of the integrated permeator taken along line 4—4 of FIG. 3.
Figure 5:
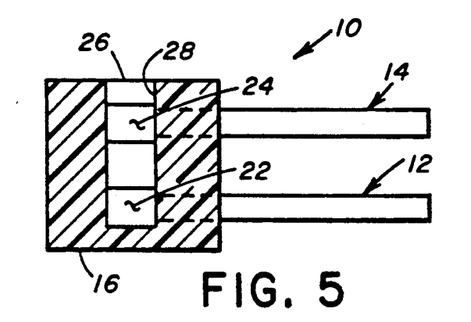
FIG. 5 is a second sectional view of the integrated permeator taken along line 5—5 of FIG. 3.
Figure 6:
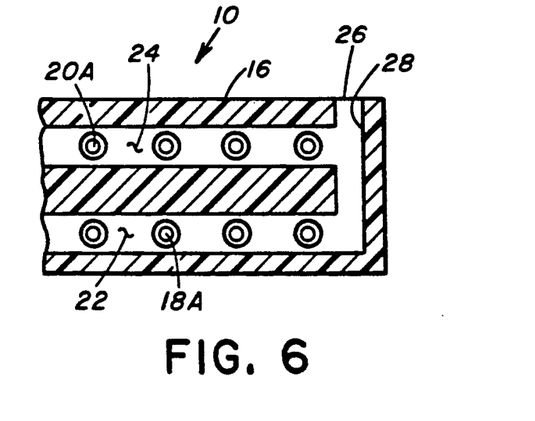
FIG. 6 is a third sectional view of the integrated permeator taken along line 6—6 of FIG. 3.
Figure 7:
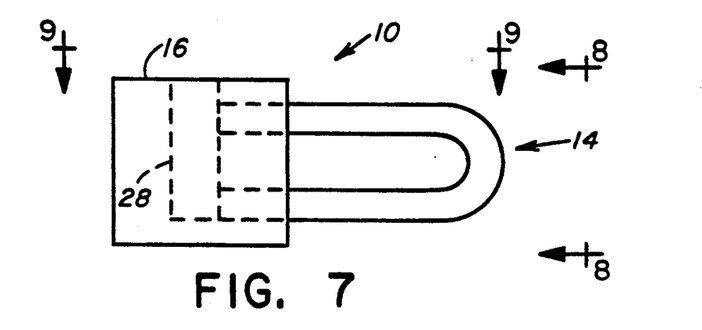
FIG. 7 is a side elevational view of an element of a second embodiment of the integrated permeator in accordance with the present invention.
Figure 8:
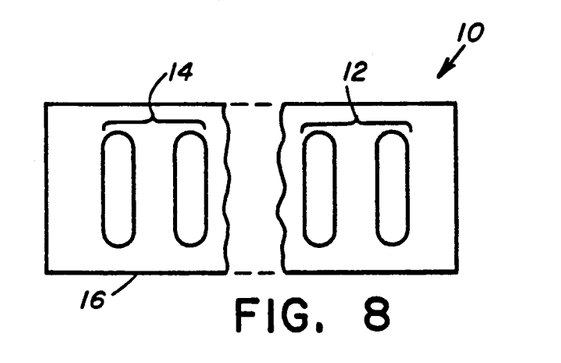
FIG. 8 is an end elevational view of the integrated permeator as seen along line 8—8 of FIG. 7.
Figure 9:
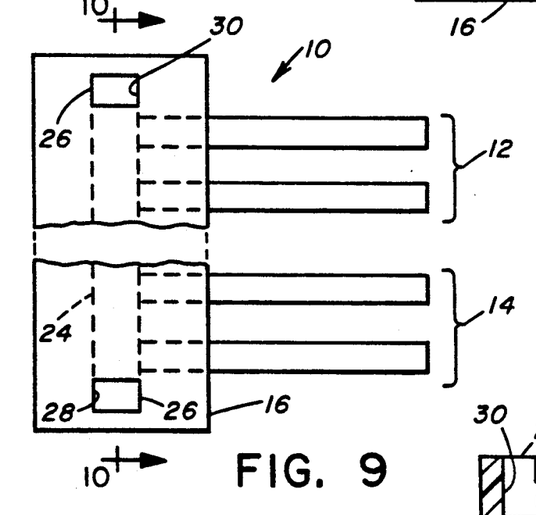
FIG. 9 is a top plan view of the integrated permeator as seen along line 9—9 of FIG. 7.

As seen in FIGS. 4–6, the portions of the hollow fibers 12, 14 which are encapsulated and supported in the interior of the solid support body 16 are the first end portions 12A, 12B and 14A, 14B of the hollow fibers 12, 14. The solid support body 16 also contains interiorly at least a pair of first and second flow distribution passages 22, 24 which intersect and communicate respectively with corresponding the first ends 18A, 20A of the internal flow channels 18, 20 of the hollow fibers 12, 14. In addition, the solid support body 16 also has at least one external port 26 opening to the exterior thereof and contains at least one flow feed passage 28 communicating the first and second flow distribution passages 22, 24 with the one external port 26. It will be observed that the second opposite end portions 12B, 14B, as well as the main portions 12C, 14C, of the hollow fibers 12, 14 extend from and are free of attachment to the solid support body 16. This provides the first embodiment of the integrated permeator 10 in a first carpet-like configuration.

The material from which the solid support body 16 is fabricated is preferably one capable of transforming from a liquid or particle (hereinafter called a "fluid") state to a solidified (hereinafter called a "solid") state, such as through drying, and of bonding with the material of the hollow fibers. For purposes of brevity, such material will be referred to as a glue-type material. Some suitable examples of such glue-type materials are resins, epoxy-based glues, adhesives, silicon, and polyurethane. The solid support body 16 can be formed entirely of these materials or of layers of different ones of these materials. Also, at least a portion of the solid support body 16 can be formed of the same material as the hollow fibers 12, 14. The solid support body 16, by being fabricated from these materials, has adequate strength without the assistance of external structures to support either internal pressurization or evacuation of the internal flow channels. 18, 20 of the hollow fibers 12, 14, via the flow distribution passages 22, 24 and flow feed passage 28, so that the integrated permeator can be employed in a wide range of different applications.

Referring to FIGS. 7-10, the second embodiment of the integrated hollow fiber membrane permeator 10 includes the first and second groups of hollow fibers 12, 14, at least one elongated solid non-permeable support body 16, and the flow distribution and feed passages 22, 24 and 28, the same as in the first embodiment. Also, as in the first embodiment, the solid support body 16 of the second embodiment encapsulates and supports portions of the hollow fibers 12, 14 therein and is fabricated so as to be inseparably and irremovably connected with the portions of the hollow fibers 12, 14.

Figure 10:
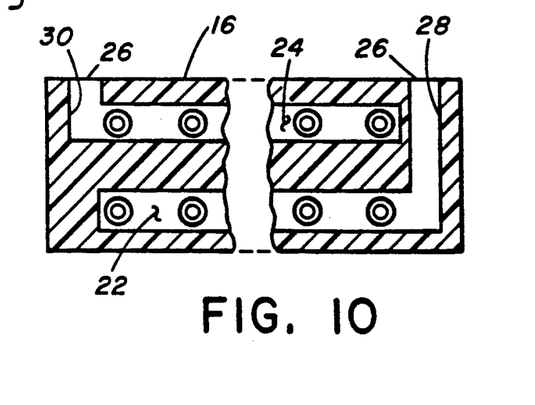
FIG. 10 is a sectional view of the integrated permeator taken along line 10—10 of FIG. 9.
Figure 11:
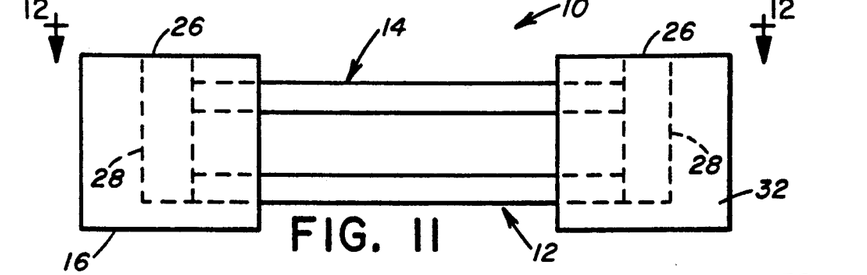
FIG. 11 is a side elevational view of an element of a third embodiment of the integrated permeator in accordance with the present invention.
Figure 12:
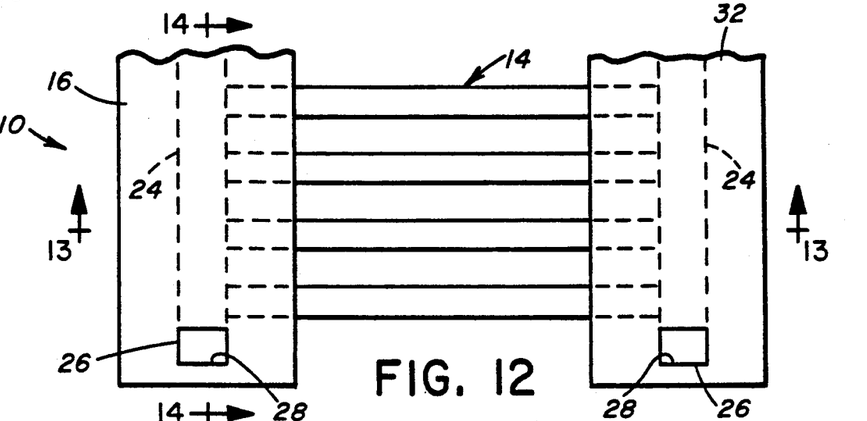
FIG. 12 is a top plan view of the integrated permeator as seen along line 12—12 of FIG. 11.
Figure 13:
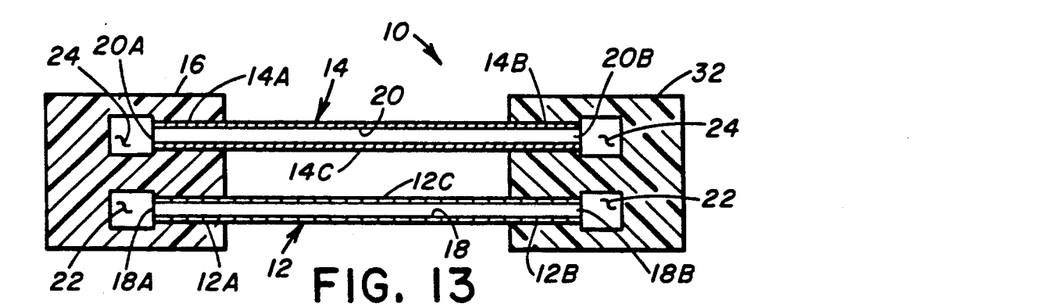
FIG. 13 is a first sectional view of the integrated permeator as seen along line 13—13 of FIG. 12.
Figure 14:
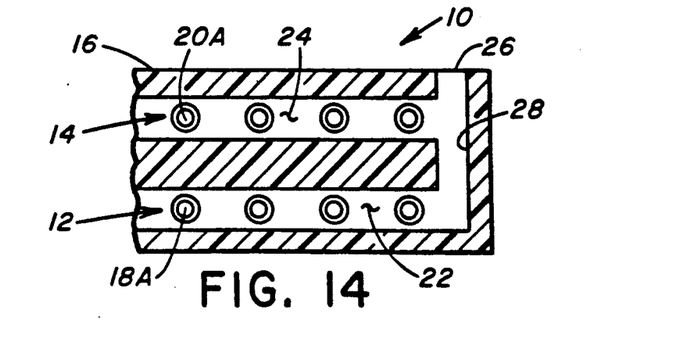
FIG. 14 is a second sectional view of the integrated permeator taken along line 14—14 of FIG. 12.

However, in the second embodiment the second opposite end portions 12B, 14B of the hollow fibers 12, 14 are also encapsulated and supported by the same one solid support body 16 interiorly thereof such that the the second ends 18B, 20B of the internal flow channels 18, 20 of the hollow fibers 12, 14 are now provided in communication with the first and second flow distribution passages 22, 24 in the same one solid support body 16. Thus, the first and second opposite end portions 12A, 12B and 14A, 14B of the hollow fibers 12, 14 now communicate respectively with the first and second flow distribution passages 22, 24. As in the first embodiment, only one flow feed passage 28 can be employed in the second embodiment, or alternatively, depending on the flow pattern desired through the integrated permeator 10 a pair of flow feed passages 28, 30 can be provide so that each is connected in communication with a different one of the first and second flow distribution passages 22, 24 as shown in FIG. 10. As a result of the above-described connections of the one solid support body 16 with the first and second opposite end portions 12A, 12B and 14A, 14B of the hollow fibers 12, 14, the main portions 12C, 14C of the hollow fibers 12, 14 are arranged in the shape of loops. This provides the second embodiment of the integrated permeator 10 in a second carpet-like configuration.

Referring to FIGS. 11-14, the third embodiment of the integrated hollow fiber membrane permeator 10 includes the first and second groups of hollow fibers 12, 14, at least one elongated solid non-permeable support body 16, and the flow distribution and feed passages 22, 24 and 28, the same as in the first and second embodiments. Also, as in the first and second embodiments, the solid support body 16 of the third embodiment encapsulates and supports portions of the hollow fibers 12, 14 therein and is fabricated so as to be inseparably and irremovably connected with the portions of the hollow fibers 12, 14.

However, in the third embodiment another, or second, elongated solid non-permeable support body 32 is provided. The second solid supporrt body 32 is made from the same material and fabricated by the same method, as described below, as the first solid support body 16. Now, the second opposite end portions 12B, 14B of the hollow fibers 12, 14 are the portions of the hollow fibers 12, 14 which are encapsulated and supported by the second solid support body 32 interiorly thereof. Thus, the second ends 18B, 20B of the internal flow channels 18, 20 of the hollow fibers 12, 14 are provided in communication with first and second flow distribution passages 22, 24 in the second solid support body 32. As a result, the first and second opposite end portions 12A, 12B and 14A, 14B of the hollow fibers 12, 14 now communicate respectively with the first and second flow distribution passages 22, 24 in the respective first and second solid support bodies 16, 32.

In all three embodiments, the first and second flow distribution passages 22, 24 in the respective elongated solid non-permeable bodies 16, 32 extend substantially perpendicular to the first and second opposite end portions 12A, 12B and 14A, 14B of the hollow fibers 12, 14. Also, it should be readily recognized that an integrated permeator of any of the three embodiments constructed respectively from the elementary structures of FIGS. 1-6, 7-10 and 11-14, can have many different shapes, such as linear, circular or cylindrical, spiral and helical configurations.

Figure 15:
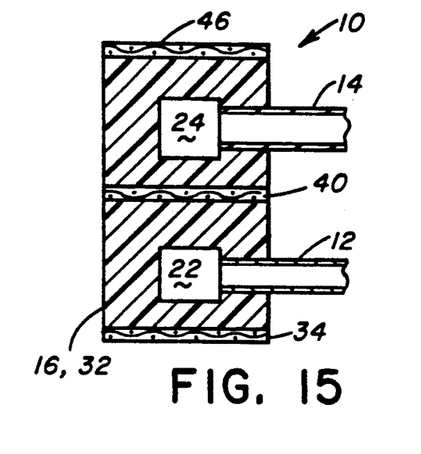
FIG. 15 is an enlarged detailed sectional view of a first configuration of a solid non-permeable support body of the integrated permeator with interior flow distribution passages formed therein in substantially aligned relationship one above the other.

Referring now to FIG. 15, there is a detailed cross-sectional illustration of a first configuation of the elongated solid non-permeable support body 16, 32 of the integrated permeator 10 of the present invention. The steps in fabricating the first configuration of the solid support body 16, 32 and the flow distribution and feed passages 22, 24 and 28 in communication with the hollow fibers 12, 14 are depicted in FIGS. 16A-16F.

Figure 16A:
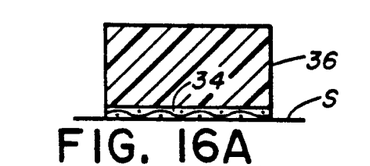
FIGS. 16A–16F are sectional views depicting the sequence of steps involved in one method of forming the integrated permeator of FIG. 15.

FIG. 16A depicts the initial steps of the fabrication method in which, first, a first support screen 34 made of a suitable material, such as fiberglass, is placed a workpiece support surface S and, second, a first layer 36 of the glue-type material in the fluid state is deposited or applied onto the support screen 34. The support screen 34 has internal spaces which become impregnated with the fluid material of the first layer 36 of glue-type material.

Figure 16B:
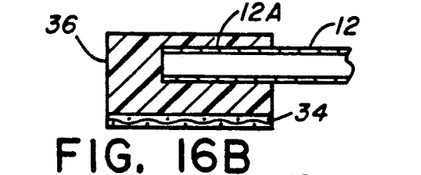

FIG. 16B depicts the third step of the fabrication method in which a portion, such as the first end portions 12A of the first group of hollow fibers 12 are applied upon the first layer 36 of glue-type material while it is still in the fluid state and before being transformed, such as by drying, to the solid state. In such manner, the applied portions of the hollow fibers 12 are encapsulated into the first layer 36 of glue-type material.

Figure 16C:
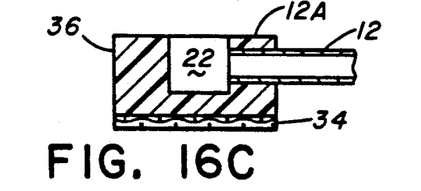

FIG. 16C depicts the fourth step of the fabrication method in which, once the first layer 36 has transformed to the solid state, the first flow distribution passage 22 is formed in the first layer 36 and in the applied portion of the hollow fibers 12 of the first group by cutting away and removing some of the first layer 36 and some of the applied portion of the hollow fibers 12. The first flow distribution passage 22 thus formed in the first layer 36 intersects and communicates with the internal flow channels 18 of the hollow fibers 12 in the first group through the first ends 18A thereof.

Figure 16D:
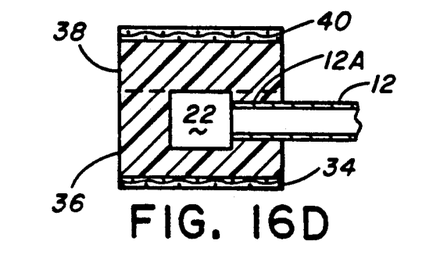

FIG. 16D depicts the fifth and sixth steps of the fabrication method. In the fifth step, a second layer 38 of glue-type material in a fluid state is deposited or applied over the upper end of the open first flow distribution passage 22 so as to close the same. The second layer 38 thus overlies and adheres to the first layer 36 and therewith closes and encapsulates the first flow distribution passage 22 and the first end portions 12A of the hollow fibers 12 between the first and second layers 36, 38 after the second layer 38 hardens to the solid state. In the sixth step, a second support screen 40 having the same construction as the first support screen 34 is applied onto the second layer 38 before it solidifies so that the second layer 38 will impregnate the spaces in the second support screen 40.

Figure 16E:
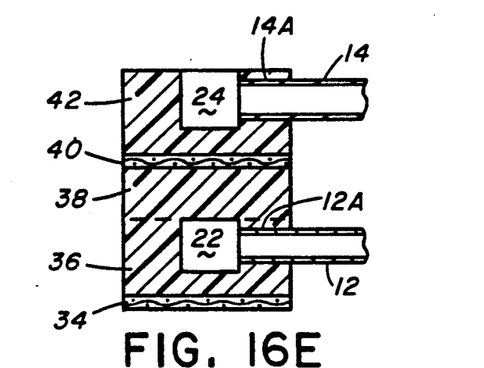

FIG. 16E depicts the seventh, eighth and ninth steps of the fabrication method which repeat the second, third and fourth steps described above. Specifically, in the seventh step a third layer 42 of the glue-type material in the fluid state is deposited or applied onto the second layer 38 and second support screen 40. In the eighth step, portions, such as the first end portions 14A, of the second group of hollow fibers 14 are applied upon the third layer 42 of glue-type material while still in the fluid state so that the applied portions of the hollow fibers 14 become encapsulated into the third layer 42. In the ninth step, after the third layer 42 has hardened, the second flow distribution passage 24 is formed in the third layer 42 and in the applied portions of the hollow fibers 14 so as to intersect and communicate with the internal flow channels 20 of the hollow fibers 14 of the second group through the first ends 20A thereof.

Figure 16F:
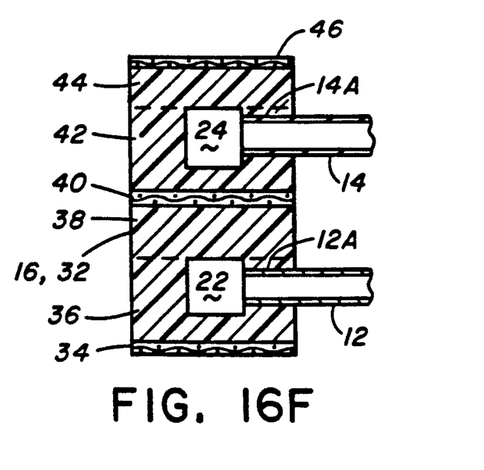

FIG. 16F depicts the tenth and eleventh steps of the fabrication method which repeat the fifth and sixth steps described above. Specifically, in the tenth step a fourth layer 44 of glue-type material in a fluid state is deposited or applied over the upper end of the open second flow distribution passage 24 so as to close the same. The fourth layer 44 thus overlies and adheres to the third layer 42 and therewith closes and encapsulates the second flow distribution passage 24 and the first end portions 14A of the hollow fibers 14 between the third and fourth layers 42, 44 after the fourth layer 44 hardens to the solid state. In the eleventh step, a third support screen 46 having the same construction as the first and second support screens 34, 40 is applied onto the fourth layer 44 before it solidifies so that the fourth layer 44 will impregnate the spaces in and bond to the third support screen 46.

Figure 17:
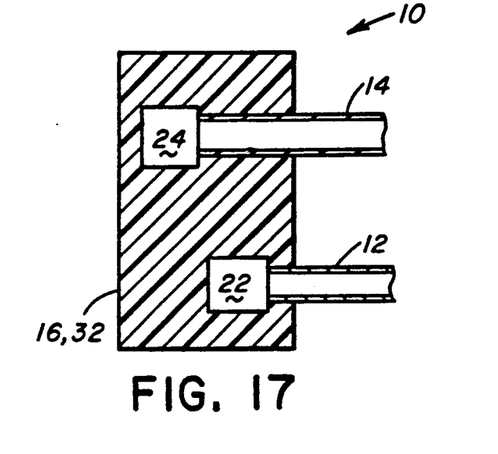
FIG. 17 is an enlarged sectional view of a second configuration of the solid non-permeable support body of the integrated permeator having the interior flow distribution passages formed therein in offset relationship one above the other.

In the final step of the fabrication method, the external port 26 and feed passage 28 are formed in the solid support body 16, 32, such as by drilling into the body at the desired location. The feed passage 28 is formed at any suitable location just as long as it intersects with the first and second distribution passages 22, 24 and communicates them with the feed port 26. In the first configuration of the solid support body 16, 32 of FIGS. 16 and 16F which utilizes the support screens 34, 40, 46, the first and second flow distribution passages 22, 24 can be spaced in alignment one above the other without weakening the strength of the solid support body 16, 32. On the other hand, if the first and second flow distribution passages 22, 24 are spaced one above the other in laterally offset relation as seen in the second configuration of the solid support body 16, 32 of FIG. 17, the support screens can be omitted and thus the corresponding steps of the fabrication method involving application of the support screens can be omitted.

INDUSTRIAL APPLICABILITY

One of the largest area of industrial application of the hollow fiber membrane permeators 10 of the present invention are in the process of oxygen-enriched air production on a low cost basis. By using the invention herein to increase the concentration of oxygen to 30-40% (compared to 20% for normal air), the energy saving of burning will be increased at least 30% over normal air. The oxygen-enriched air also has application in increasing the rate of biotechnological and waste water cleaning processes. On the other hand, nitrogen-enriched air also produced by the invention has many applications. Important applications are as the source of nitrogen for controlled atmosphere generation in food storage and production of inert gas in enhanced oil production. In food storage, by exchanging the normal air to nitrogen-enriched air (97% of nitrogen) not only is storage time of food extended but also the storage temperature can be substantially raised, which will result in a significant increase in energy effectiveness. It should also be understood that the integrated hollow fiber membrane permeators 10 of the present invention can be applied in existing membrane applications, such as hydrogen removal from different sources and carbon dioxide removal from natural gas, with corresponding increased effectiveness.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An integrated hollow fiber membrane permeator, comprising:
   (a) at least first and second groups of hollow fibers of permeable membrane material, each of said hollow fibers of said groups having first and second spaced opposite end portions and an elongated main portion extending between and interconnecting said first and second opposite end portions, each of said hollow fibers of each group also having an internal flow channel extending through said main portion, said internal flow channel having first and second ends at said first and second opposite end portions of said hollow fiber; and
   (b) at least one elongated solid non-permeable support body encapsulating and supporting interiorly one of said first and second opposite end portions of said hollow fibers of said groups and containing interiorly at least first and second flow distribution passages communicating respectively with corresponding ones of said first and second ends of said internal flow channels of said hollow fibers of said groups, said one elongated solid non-permeable support body also having at least one external port opening to the exterior thereof and containing at least one flow feed passage communicating said first and second flow distribution passages to said one external port.

2. The integrated permeator of claim 1 wherein said main portion and other of said first and second opposite end portions of said hollow fibers of said groups are free of said one elongated solid non-permeable support body so as to provide a carpet-like configuration.

3. The integrated permeator of claim 1 wherein said first and second flow passages in said one elongated solid non-permeable support body extend substantially transverse to one of said first and second opposite end portions of said hollow fibers.

4. The integrated permeator of claim 1 wherein said one elongated solid non-permeable support body is formed of a material capable of transforming from a fluid state to a solidified state.

5. The integrated permeator of claim 1 wherein said one elongated solid non-permeable support body is formed of a resinous material.

6. The integrated permeator of claim 1 wherein said one elongated solid non-permeable support body is formed of an epoxy-based hardened glue.

7. The integrated permeator of claim 1 wherein said one elongated solid non-permeable support body is formed of an adhesive material.

8. The integrated permeator of claim 1 wherein said one elongated solid non-permeable body is formed of layers of different materials.

9. The integrated permeator of claim 1 wherein said one elongated solid non-permeable body is formed of a silicon material.

10. The integrated permeator of claim 1 wherein said one elongated solid non-permeable body is formed of a polyurethane material.

11. The integrated permeator of claim 1 wherein said one elongated solid non-permeable body is formed of the same material as said hollow fibers.

12. The integrated permeator of claim 1 wherein said first and second flow distribution passages in said elongated solid non-permeable body are spaced from one another and laterally offset from one another.

13. The integrated permeator of claim 1 wherein said elongated solid non-permeable body includes:
   at least one permeable semi-rigid support screen; and
   a semi-flexible material having a first elongated portion impregnating and attached to said support screen and a second elongated portion merging from said first elongated portion and projecting from a side of said support screen, said first and second flow distribution passages and said flow feed passages being defined in said second elongated portion of said material and said first and second end portions of said hollow fibers being encapsulated in said second elongated portion of said material.

14. The integrated permeator of claim 13 wherein said first and second flow distribution passages in said elongated solid non-permeable body are spaced from one another and are substantially aligned with one another.

15. The integrated permeator of claim 1 wherein the other of said first and second opposite end portions of said hollow fibers of said groups are also encapsulated and supported by said one elongated solid non-permeable body interiorly thereof such that the others of said first and second ends of said internal flow channels of said hollow fibers of said group are in communication with said first and second flow distribution passages in said one elongated solid non-permeable body.

16. The integrated permeator of claim 15 wherein:
   said first and second opposite end portions of said hollow fibers of said first group communicate with said first and second flow distribution passages; and
   said first and second opposite ends portions of said hollow fibers of said second group communicate with said first and second flow distribution passages.

17. The integrated permeator of claim 15 wherein said main portions of said hollow fibers are arranged in the shape of loops so to provide a carpet-like configuration.

18. The integrated permeator of claim 1 further comprising:
   at least a second elongated solid non-permeable body encapsulating and supporting interiorly the other of said first and second opposite end portions of each of said hollow fibers of said groups and containing interiorly at least first and second flow distribution passages communicating respectively with corresponding others of said first and second ends of said internal flow channels of said hollow fibers of said groups, said second elongated solid non-permeable body also having at least one external port opening to the exterior thereof and containing at least one flow feed passage communicating said first and second flow distribution passages to said one external port.

19. The integrated permeator of claim 18 wherein:
   said first and second opposite end portions of said hollow fibers of said first group communicate with said first flow distribution passages of said elongated solid non-permeable bodies and said first and second opposite ends portions of said hollow fibers of said second group communicate with said second flow distribution passages.

20. The integrated permeator of claim 18 wherein said first and second flow distribution passages in said elongated solid non-permeable bodies extend substantially transverse to said first and second opposite end portions of said hollow fibers.

21. The integrated permeator of claim 18 wherein said one elongated solid non-permeable support body is formed of a material capable of transforming from a fluid state to a solidified state.

22. The integrated permeator of claim 18 wherein said first and second elongated solid non-permeable bodies are formed of a resinous material.

23. The integrated permeator of claim 18 wherein said first and second elongated solid non-permeable bodies are formed of an epoxy-based hardened glue.

24. The integrated permeator of claim 18 wherein said first and second elongated solid mon-permeable bodies are formed of an adhesive material.

25. The integrated permeator of claim 18 wherein said first and second elongated solid non-permeable bodies are formed of layers of different materials.

26. The integrated permeator of claim 18 wherein said first and second elongated solid non-permeable bodies are formed of a silicon material.

27. The integrated permeator of claim 18 wherein said first and second elongated solid non-permeable bodies are formed of a polyurethane material.

28. The integrated permeator of claim 18 wherein said first and second elongated solid non-permeable bodies are formed of the same material as said hollow fibers.

29. The integrated permeator of claim 18 wherein said first and second flow distribution passages in each of said elongated solid non-permeable bodies are spaced from one another and laterally offset from one another.

30. The integrated permeator of claim 18 wherein each of said elongated solid non-permeable bodies includes:
   at least one permeable semi-rigid support screen; and
   a semi-flexible material having a first elongated portion impregnating and attached to said support screen and a second elongated portion merging from said first elongated portion and projecting from a side of said support screen, said first and second flow distribution passages and said flow feed passage being defined in said second elongated portion of said material and said first and second end portions of said hollow fibers being encapsulated in said second elongated portion of said material.

31. The integrated permeator of claim 30 wherein said first and second flow distribution passages in each of said elongated solid non-permeable body are spaced from one another and are substantially aligned with one another.

32. A method of fabricating an integrated hollow fiber membrane permeator, comprising the steps of:
   (a) applying a first layer of a glue-type material in a fluid state onto a non-stick surface;
   (b) applying a portion of a first group of hollow fibers of permeable membrane material having internal flow channels upon the first layer of glue-type material while still in the fluid state and before transforming to a solid state so as to encapsulate the applied portions of the hollow fibers of the first group into the first layer of glue-type material;

(c) after transforming of the first layer of glue-type material to the solid state, forming in the first layer and in the applied portion of the hollow fibers of the first group encapsulated and supported therein a first flow distribution passage so as to intersect and communicate with the internal flow channels of the hollow fibers of the first group; and (d) applying a second layer of glue-type material in a fluid state over the first flow distribution passage formed in the first layer and in the applied portion of the hollow fibers of the first group so as to cause the second layer to overlie and adhere to the first layer and thereby encapsulate the first flow distribution passage and the applied portion of the hollow fibers between the first and second layers of glue-type material after transforming of the second layer to a solid state.

33. The method of claim 32 further comprising the steps of:

applying a support screen having internal spaces on the support surface; and then applying the first layer in the fluid state over the support screen so as to impregnate the internal spaces of the screen.

34. The method of claim 32 further comprising the steps of:

(e) applying a third layer of a glue-type material in a fluid state onto the second layer;

(f) applying a portion of a second group of hollow fibers of permeable membrane material having internal flow channels upon the third layer of glue-type material while still in the fluid state and before transforming to a solid state so as to encapsulate the applied portions of the hollow fibers of the second group into the third layer of glue-type material;

(c) after transforming of the third layer of glue-type material to the solid state, forming in the layer strip and in the applied portion of the hollow fibers of the second group encapsulated and supported therein a second flow distribution passage so as to intersect and communicate with the internal flow channels of the hollow fibers of the second group; and (d) applying a fourth layer of glue-type material in a fluid state over the second flow distribution passage formed in the third layer and in the applied portion of the hollow fibers of the second group so as to cause the fourth layer to overlie and adhere to the first layer and thereby encapsulate the second flow distribution passage and the applied portion of the hollow fibers of the second group between the third and fourth layer of glue-type material after transforming of the fourth layer to the solid state.

35. The method of claim 34 further comprising the steps of:

applying a support screen having internal spaces upon the second layer before transforming of the second strip to the solid state; and then applying the third layer in the fluid state over the support screen so as to impregnate the internal spaces of the screen.

36. The method of claim 34, further comprising the steps of:

forming a feed port in an exterior surface of one of the first, second, third or fourth layers; and forming a flow feed passage in the first, second, third and fourth layers so as to intersect with the first and second passages and communicate the first and second passages with the feed port.

37. The method of claim 34 further comprising the steps of:

applying a support screen having internal spaces upon the fourth layer before transforming of the fourth layer to the solid state.

* * * * *